G. PEREIRE AND G. JOLIVET.
CONSTRUCTION OF THE PERMANENT WAY FOR RAILWAY CARRIAGES OF LARGE CAPACITY.
APPLICATION FILED MAR. 14, 1919.

1,385,269.  
Patented July 19, 1921.

Inventors,
Gustave Pereire & Gustave Jolivet
by Marry Cameron Lewis & Massie
Attys

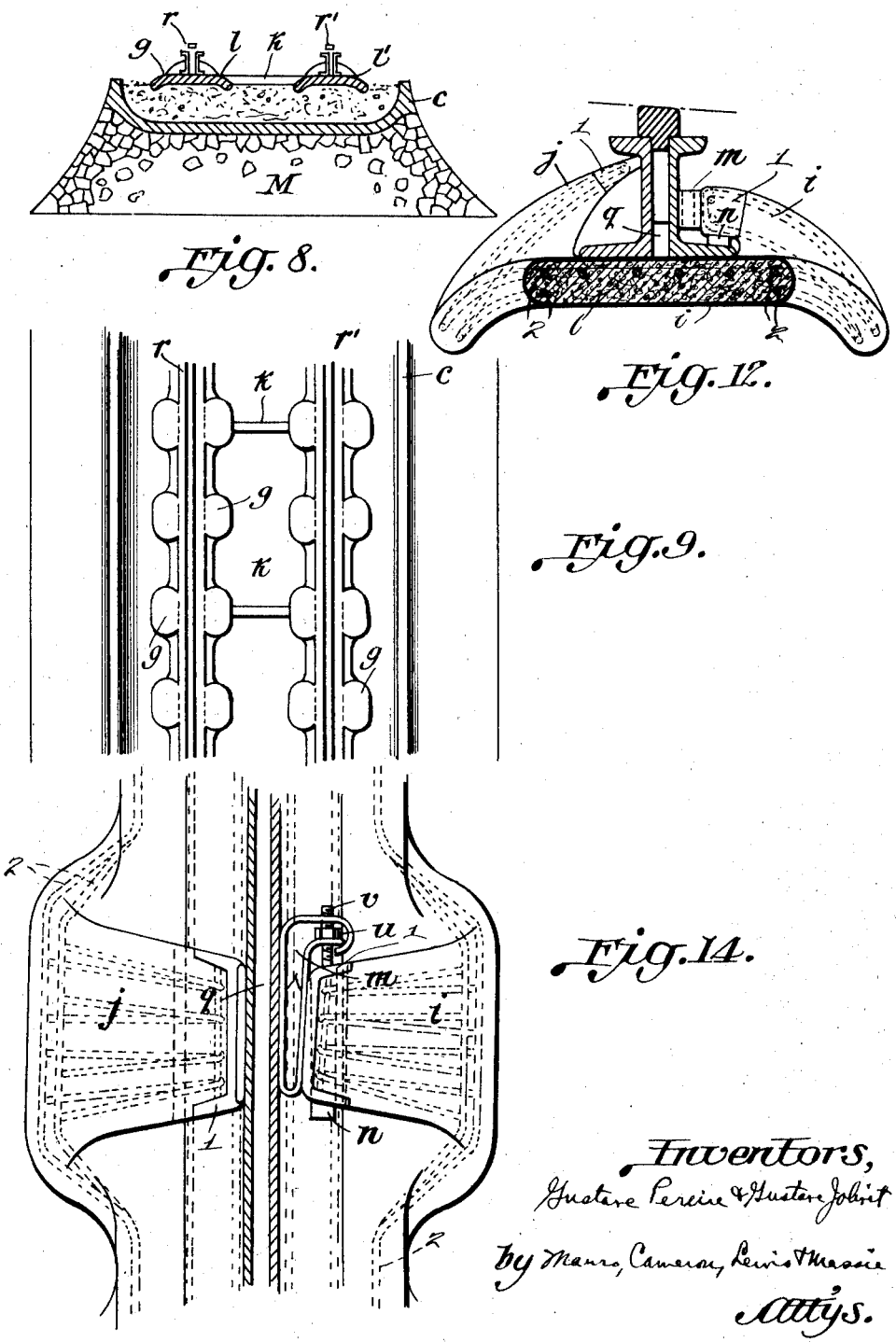

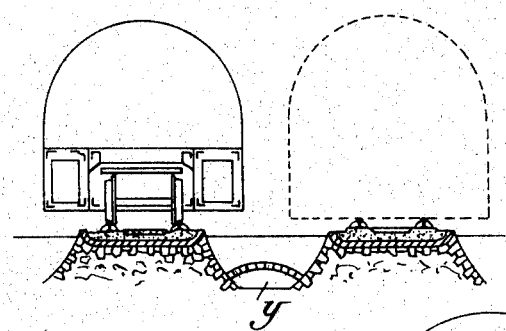
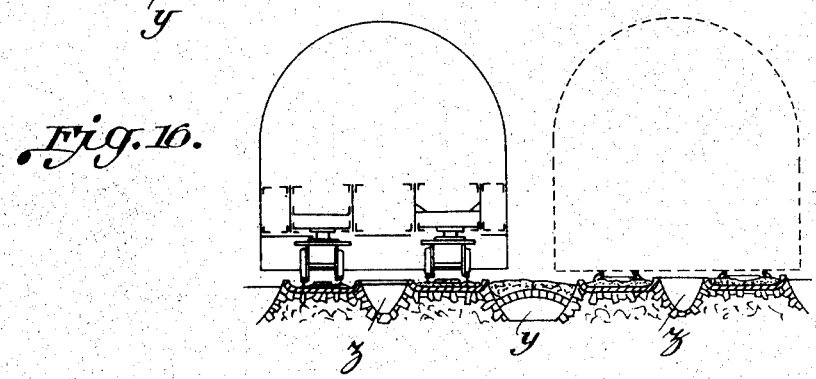
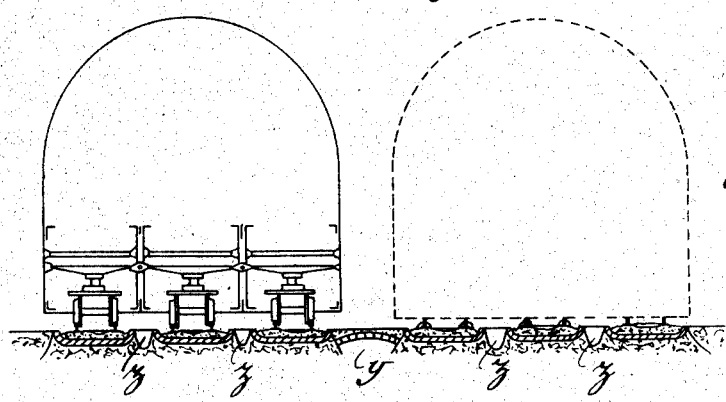
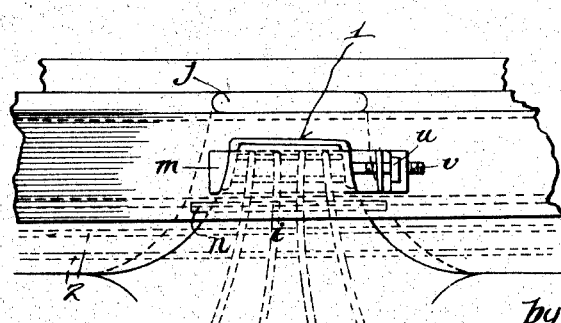

UNITED STATES PATENT OFFICE.

GUSTAVE PEREIRE AND GUSTAVE JOLIVET, OF PARIS, FRANCE.

CONSTRUCTION OF THE PERMANENT WAY FOR RAILWAY-CARRIAGES OF LARGE CAPACITY.

1,385,269. Specification of Letters Patent. Patented July 19, 1921.

Application filed March 14, 1919. Serial No. 282,688.

*To all whom it may concern:*

Be it known that we, GUSTAVE PEREIRE and GUSTAVE JOLIVET, citizens of France, and residents of 69 rue de la Victoire, Paris, France, have invented new and useful Improvements in the Construction of the Permanent Way for Railway-Carriages of Large Capacity, which improvements are fully set forth in the following specification.

This invention has for its object the construction of the permanent way of railway carriages capable of supporting considerable loads.

The present invention has for its object a construction of a permanent way composed of rails formed of three parts. Methods of carrying out this invention are illustrated in the accompanying drawings.

In these drawings Figures 1, 2 and 3 are respectively a cross section, an elevation and a plan of a rail.

Figs. 4 and 5 are respectively a section and a plan of a modification.

Figs. 6 and 7, 8 and 9, 10 and 11 show respectively in section and in plan, different methods of forming permanent ways in accordance with this invention.

Figs. 12, 13 and 14 illustrate in section, elevation and plan respectively, the details of one form of brackets.

Figs. 15, 16 and 17 show an arrangement of double lines for carriages of large capacity such as disclosed in our copending application Serial No. 281,302 filed Mar. 7, 1919.

The rail is formed of three parts, two vertical portions $a$, $a^1$ of soft steel or semi steel forming an I which support a tread $b$ of extra hard steel (manganese steel for example), the parts being firmly bolted together and fished or even riveted, the joints of the several parts being staggered.

It is to be remarked that in this type of rail the tread alone forms the movable portion of the points, and the guard rails at the crossings, for by reason of the loads it is preferable to adopt for the crossings movable guard rails of the American type to make sure of perfect continuity of the supports for the passage of the wheels.

The vertical portions can be continuous with connections and if necessary suitably welded in such a manner as to insure a support without weak points throughout the crossings.

As wear takes place above all at the tread this portion may easily be replaced when necessary, hence, economy over existing permanent ways which necessitate a renewal of the rails after a certain wear.

Figure 1:
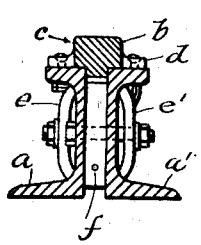
Figure 2:
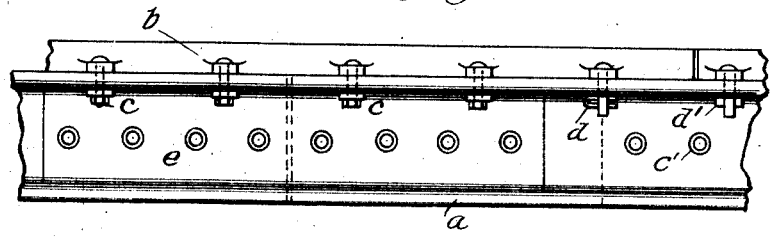
Figure 3:
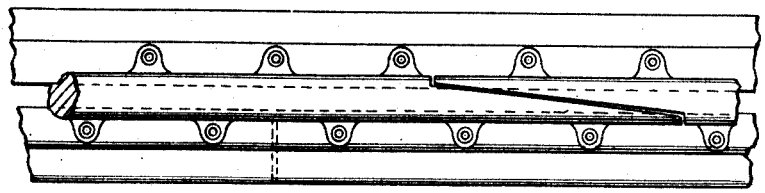
Figure 4:
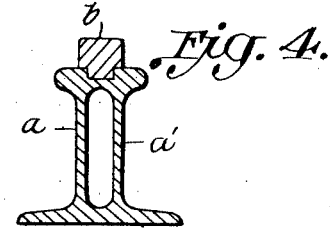
Figure 5:
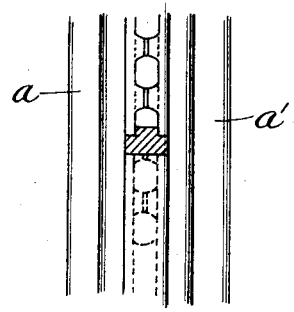

Two identically shaped parts $a$, $a^1$, formed of iron of U section having unequal sides, support a tread $b$ connected with them or by an arrangement of tenons, bolts or holes (Figs. 4 and 5) or by bolts such as $c$ (Figs. 1–3) or keyed bolts such as $d$, $d^1$. This tread may or may not comprise a piece which is inserted between the two vertical pieces and all in such a manner as better to resist the lateral thrusts of the leading flanges of the wheels of the trucks.

In order to diminish as much as possible shocks at the crossing of the joints, the tread at these joints is beveled.

The parts $a$ and $a^1$ (the joints of which are staggered) are connected together in the usual manner of connecting angle irons and comprise an inner fish plate $f$ and two outer fish plates $e$ and $e^1$. The size of these fish plates and the number of the bolts are calculated in such a manner as to give the maximum strength to the I (formed of the pieces $a$ and $a^1$) which support the treads.

In Figs. 6–11 are shown different methods of forming permanent ways in accordance with this invention in which the rails rest either upon cross sleepers or upon longitudinal sleepers which transmit the pressure through the intermediary of a layer of ballast of hard material allowing the easy regulation of the permanent way. The permanent way and ballast are together contained in a bed $c$ of concrete which may be armored (Figs. 6, 7, 8 and 10), this bed rests upon a foundation M which distributes the pressure over the ground. This foundation M is constructed of a block of stones which may or may not be cemented together and is sufficiently high and wide for the pressure on the ground not to be too great.

Figure 6:
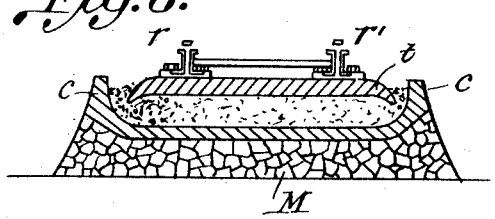
Figure 7:
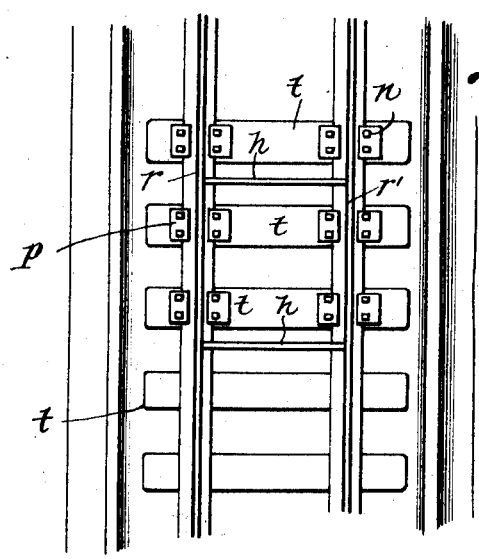

Referring to Figs. 6 and 7, rails $r$, $r^1$, rest upon the metal sleepers $t$ and are fixed thus by means of clips $p$ in a known way.

Because of the height of the rails and in order to maintain their correct distance apart cross ties $h$ may be provided.

In Figs. 8, 9, 10 and 11 the rails $r$ and $r^1$ rest upon longitudinal sleepers $l$ and $l^1$ or armored concrete provided with chairs $g$.

In Figs. 8 and 9 the two longitudinal sleepers are in the same concrete bed c and are connected from time to time with cross pieces k maintaining their distance apart.

Figure 10:
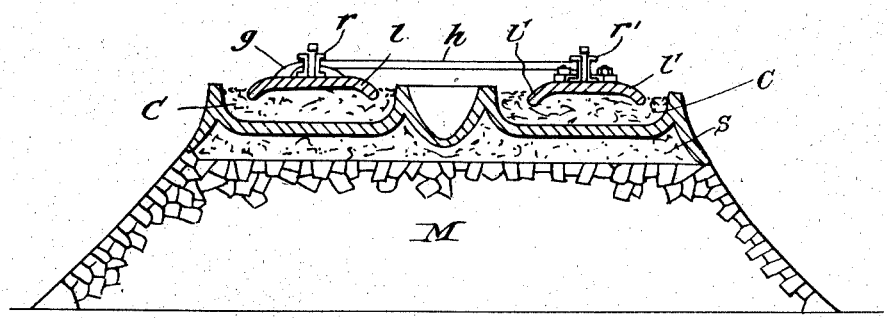
Figure 11:
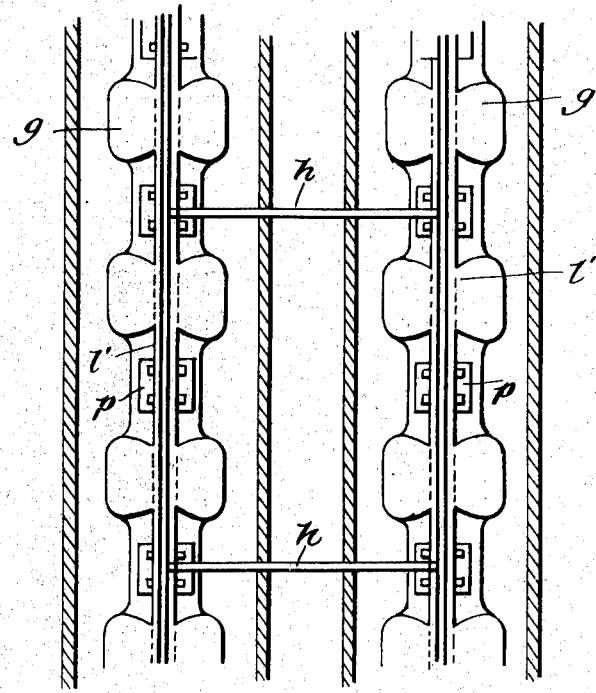

In Figs. 10 and 11, the longitudinal sleepers are placed in separated beds c; this construction is particularly applicable when the width of the truck gages is large (such as when the permanent way has to support the largest possible carriages of a width of about three times that of the permanent way). Each bed c conveys pressure to the foundation M through the intermediary of a bed of sand s. The distance between the pair of rails is maintained by cross pieces h going from rail to rail.

In the arrangement shown in Figs. 10 and 11, the rails are moreover maintained upon the longitudinal sleepers by their fixture within the chairs g by means of the clips p.

Figs. 12, 13 and 14 illustrate in section, elevation and plan the details of one form of bracket. A portion j (the outer side of the permanent way) abuts against the rail in such a manner as to resist tilting. A portion i (inner side of the permanent way) receives a wedge m which may be of steel and be maintained in place by means of a screw v and a nut u the screw being fast with the portion i. A key n insures that the base of the rail is closely applied against the longitudinal sleeper and prevents creeping of this rail. The two vertical portions of the rails may be maintained with regard to each chair at a correct distance apart by means of a distance piece q, in the construction shown in Fig. 4, these distance pieces q are useless.

The free space between the two portions of the chair is such as to allow the rails to be easily placed in position.

In Figs. 12, 13 and 14, each of the vertical portions of the rail may be inserted separately by turning the projecting portion about the upper edge of the corresponding parts i or j of the chairs.

The contact surfaces of the chairs with the rail are formed by metallic armored portions 1 connected to the reinforcing elements 2 forming the skeleton of the longitudinal sleeper of reinforced concrete.

The longitudinal sleepers are made as long as possible with expansion joints if necessary, these joints being formed so as not to diminish the resistance of the arrangement of the longitudinal sleepers at these points.

The inclination of $\frac{1}{18}$ or $\frac{1}{20}$ of the tread is preferably obtained by shaping the tread and not by tilting the axis of the rail.

Because of the advantage in making the lines so as to allow large carriages running on two neighboring lines to easily pass around curves, it is best to allow a free space of 1 m. 50 to 2 m. between the shaped permanent ways of the neighboring tracks although carriages fulfilling most requirements only need a free space throughout of 0 m. 50 for their passage at a curve of 300 m. radius.

In Figs. 15, 16 and 17 is shown an arrangement of double lines for carriages of large capacity. Between each line there is provided an arch y protecting a large drainage conduit. Small conduits z may also be provided between each pair of rails in order to complete the drainage and to receive the pipes for signaling or other purposes.

Fig. 15 is applicable to carriages of the mono rail type, and therefore has the appearance of an ordinary railway line. The carriages may attain a width of above 8 m. and total width l occupied by the double line is therefore about 20 m.

Fig. 16 shows carriages running on four rails, the width of the carriage may attain about 10 m. and the total width l of the double line 23 to 25 m.

Fig. 17 relates to carriages running on three pairs of rails, the width of the carriages may be about 12 m. and the total width l of the double line 27 to 30 m.

Claims:

1. A compound railway rail, comprising web side portions having base portions and top flanged portions, means securing said web portions together, a removable tread having side flange portions adapted to be seated on the top flanges of said web portions and means for fastening said tread flanges to said top web flanges.

2. A compound railway rail, comprising oppositely disposed web side portions each portion having a base flange and a rail supporting flange, fish plates intermediate said web portions, and other fish plates exterior to said web portions, means securing said plates and web portions together, a sectional removable tread having side flanges adapted to be seated on said rail supporting flanges and means securing said tread flanges to said supporting flanges, the joints of said fish plates and said web portions being staggered in relation to each other.

3. In combination, a railway rail for heavy carriages, a longitudinally arranged armored cement sleeper therefor having at intervals oppositely disposed chair portions for receiving said rail, and wedge means between the rail and chair portions securing the rail against lateral displacement.

4. In combination, a railway rail for heavy carriages, a longitudinally arranged armored cement sleeper therefor having at intervals oppositely disposed chair portions consisting of upwardly extending portions of said armor and wedge means between said rail and said chair portions for securing the rail in place.

5. In combination, a railway rail for heavy carriages, a longitudinally arranged armored cement sleeper therefor having at intervals metal faced chair portions for receiving said rail, and wedge means between said rail and said chairs for securing the rail against lateral displacement and against creeping over the sleeper.

6. In combination, railway rails adapted to receive heavy carriages, longitudinally arranged armored cement sleepers to which said rails are secured, a concrete bed containing ballast for receiving said sleepers and a broken stone foundation under said bed for distributing pressure to the ground.

7. In combination, railway rails adapted to receive heavy carriages, longitudinally arranged armored cement sleepers to which said rails are secured, cement cross pieces tying said sleepers, a concrete bed containing ballast for receiving said sleepers, and a broken stone foundation under said bed for distributing pressure to the ground.

8. In combination, railway rails adapted to receive heavy carriages, longitudinally arranged reinforced cement sleepers adapted to support said rails, each sleeper being provided at intervals with oppositely disposed chair portions of armored cement extending upward from the body of said sleeper and adapted to receive between them the web of said rail, wedge means between said rail and said chair portions for holding the rail against lateral displacement and against creeping, said sleeper having a concave portion under said chair portions into which ballast may be rammed for leveling the sleeper.

9. In combination, railway rails adapted to receive heavy carriages, longitudinally arranged reinforced cement sleepers adapted to support said rails, each sleeper being provided at intervals with oppositely disposed chair portions of armored cement extending upward from the body of said sleeper and adapted to receive between them the web of said rail, yielding wedge means between the rail web and one of said upwardly extending chair portions holding the rail against lateral displacement, and a second wedge means between one of said upwardly extending portions and the foot of the rail for holding the latter against creeping.

In testimony whereof we have signed this specification.

GUSTAVE PEREIRE.
GUSTAVE JOLIVET.